C. F. SCOTT.
WATERING TROUGH.
APPLICATION FILED NOV. 3, 1916.

1,216,854.

Patented Feb. 20, 1917.

Witnesses
Lloyd R. Cornwall
Albert Peck

Inventor
Charles F. Scott

By
Hubert Peck   Attorney

UNITED STATES PATENT OFFICE.

CHARLES F. SCOTT, OF MEMPHIS, TEXAS.

WATERING-TROUGH.

1,216,854.  Specification of Letters Patent.  Patented Feb. 20, 1917.

Application filed November 3, 1916. Serial No. 129,302.

*To all whom it may concern:*

Be it known that I, CHARLES F. SCOTT, a citizen of the United States, and resident of Memphis, in the county of Hall and State of Texas, have invented certain new and useful Improvements in and Relating to Watering-Troughs, of which the following is a specification.

This invention relates to certain improvements in watering troughs and the like; and the objects and nature of the invention will be readily understood by those skilled in the art in the light of the following explanation of the accompanying drawings illustrating what I now believe to be the preferred embodiments and mechanical expressions from among other formations, arrangements and constructions within the spirit and scope of the invention.

An object of the invention is to provide an improved stock watering trough having drinking pockets formed in the sides thereof.

A further object of the invention is to provide a watering trough having a removable cover and a series of drinking pockets formed in the side walls thereof.

A further object of the invention is to provide a watering trough having a series of drinking pockets formed in the side walls thereof and extending inwardly from said walls.

A further object of the invention is to provide a watering trough having a series of inwardly extending drinking pockets formed in the walls thereof and a removable cover adapted to rest upon said drinking pockets.

A further object of the invention is to provide an open top watering trough having a series of drinking pockets formed in the side walls thereof and a removable cover for said trough supported by said drinking pockets and closing the open top of the trough.

A further object of the invention is to provide a watering trough having a series of drinking pockets and automatic means for maintaining the proper liquid level in said trough and said drinking pockets.

A further object of the invention is to provide a watering trough in which the various elements which form the completed trough of my invention are contained within and inclosed by the side walls thereof.

A further object of the invention is to provide improvements in arrangements and combinations of elements for the production of a practical, efficient and inexpensive watering trough.

The invention consists in certain novel features in construction and combinations and arrangements as more fully and particularly set forth and specified hereinafter.

Referring to the accompanying drawings.

Figure 1:
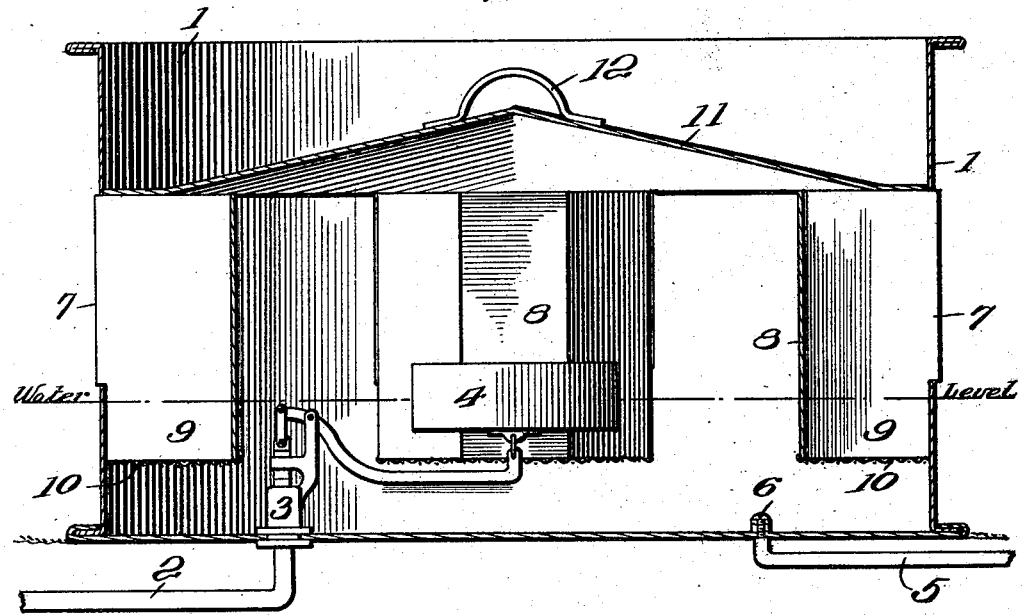
Figure 1, is a vertical section taken on the line 1—1, Fig. 2.
Figure 2:
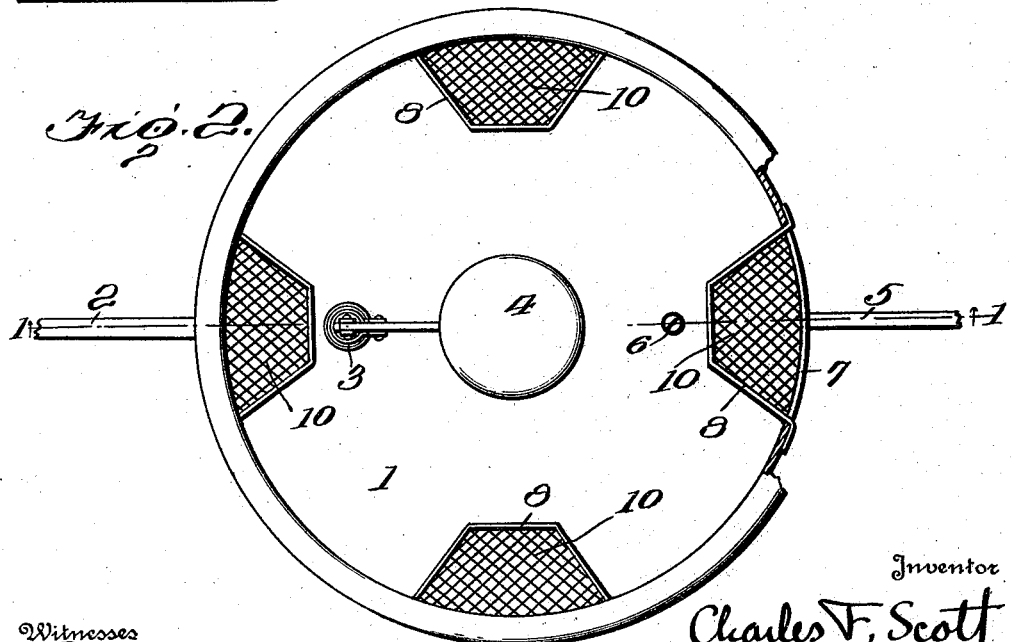
Fig. 2, is a top plan view with the trough or tank cover removed.

My invention comprises a watering trough which is provided with a series of drinking pockets in the sides thereof. These drinking pockets are readily accessible through openings in the side walls of the trough. The pockets extend inwardly from the walls of the trough and their upper ends terminate a distance below the top edge of the walls, thereby forming a series of seats or projections around the upper portion of the inside of the trough. A suitable cover or top is provided, which when it is desired to close the trough against access through the top is removably placed upon the projections or seats formed by the upper ends of the drinking pockets and is supported thereby. Thus, the outside of the trough is free from projections or unevenness and the pockets and cover all lie within the trough and are protected against breakage or damaging molestation by stock or other animals.

Suitable automatic means are provided within the trough whereby the proper liquid level is maintained within the drinking pockets. In the example illustrated, this means comprises a float operated and controlled valve on the inlet pipe, although any appropriate means adapted to maintain a proper liquid level in the drinking pockets may be used.

Referring particularly to the accompanying drawings, I show the open top trough or tank 1, connected by pipe 2 to any desired source of supply (not shown). Pipe 2 enters the trough or tank 1, and is provided at its end with a valve 3 which is operated and controlled by a suitable float 4. The tank is provided at any desired point with a drain pipe 5, closed by a removable plug 6. The valve 3 and float 4 are so adjusted and arranged that the water in the tank may be maintained at any desired level. When the water in the tank or trough falls below the desired level the float 4 drops and opens the valve 3, thereby permitting an inflow of water from the supply pipe 2 into the tank, and as the water level is raised the float 4 is lifted and upon reaching the desired level closes the valve 3 and cuts off the inflow of water into the tank or trough from the supply pipe 2. Thus it is seen that the water in the trough or tank 1 may be automatically maintained at any desired level. However, I do not wish to limit myself to the specific means shown and described, nor to the exact position thereof, as any means placed in any position which will attain the desired result, may be used without departing from the spirit and scope of my invention.

A series of openings 7 are formed in the side walls of the tank or trough 1. Any desired number of these openings may be formed in the trough, although in the present instance, I have disclosed four such openings placed at equal distances apart in the side walls of the trough or tank.

These openings 7 terminate a distance above and a distance below the bottom and top edges of the side walls, respectively, or are formed at points approximately midway between the tops and bottoms of the side walls.

In the specific example illustrated, I show the drinking pockets formed by plates or strips 8 bent into approximately U-shaped form and suitably fastened across the inside of the openings 7 in the walls of the trough or tank 1, with their concave sides facing said walls. These plates or strips 8 extend a distance below the bottoms or lower edges of the openings 7, and form the pockets 9 which inclose the portions of the water in the trough or tank to which the stock or other animals have access through the openings 7. The open bottoms of the pockets 9 are covered by any suitable screening or perforated material 10 which permits the water in the tank to enter into the pockets and to assume the same level therein as the level of the water in the trough or tank, which level, as hereinbefore explained, is controlled and regulated by the valve 3 and float 4.

The screening 10 also prevents entry into the body of water in the trough of any foreign matter and will also prevent smaller animals from falling into the trough and being drowned.

The level of the water in the trough or tank 1 is usually maintained a slight distance below the lower edges of the openings 7, as clearly shown in Fig. 1 of the drawings.

I provide a removable cover or top 11 having any suitable means, such as a handle 12 whereby it may be lifted from the trough or tank 1. The cover 11 preferably fits snugly down into the open top of the trough 1, and completely closes the same.

The upper ends of the plates or strips 8 which form the pockets 9, may extend any desired distance past the top of the openings 7 but in the example illustrated, I have shown these plates terminating at a point approximately in line with the top edges of the openings 7. It will now be seen that the upper edges of the series of plates 8 which form the pockets 9 terminate in the same horizontal plane and form a series of seats or projections extending inwardly from the side walls of the trough 1 and upon which the removable cover 11 may be supported a distance below the upper edge or open top of the trough or tank 1, thereby closing the contents of the trough against access thereto except through the openings 7 and from pockets 9.

A device embodying my invention, provides drinking pockets on the inside of the trough or tank and constructs the pockets in such a manner that the upper ends thereof form seats or projections adapted to support a removable cover or closure. In this manner the outside of the trough or tank presents a surface having no projections of consequence against which live stock can injure themselves or which may be damaged by being struck by live stock. All the various parts which are combined to form the improved watering trough of my invention are positioned on the inside thereof, where they are safe from damage and possibility of molestation.

The removable cover or closure supported on the upper ends of the members which form the inwardly extending drinking pockets may be removed and the top of the trough or tank left open, whereby large animals may drink therefrom without recourse to the drinking pockets. This feature of supporting the closure is a valuable feature of my invention as brackets or other supports are unnecessary, thereby simplifying the number of parts and permitting the inside of the tank to be free from projections other than the pockets themselves.

I do not wish to limit myself to the exact disclosures hereof or the specific structure and arrangement of parts as disclosed, as any equivalent structure or arrangement may suffice to obtain my results without departing from the spirit and scope of my invention.

What I claim is:

1. In a device of the character substantially as described, a trough, means located within said trough adapted to maintain a determined liquid level therein, drinking pockets extending inwardly from the side walls of said trough and accessible therethrough, and a removable cover for said trough supported by said pockets.

2. In a device of the character substantially as described, a trough, drinking pockets extending inwardly from the side walls thereof and a removable closure for said trough resting upon and supported by said pockets.

3. A device of the character substantially as described, comprising a trough provided with drinking pockets and a removable closure supported by said pockets.

4. A device of the character substantially as described, comprising a trough provided with inwardly extending drinking pockets and a closure supported by said drinking pockets.

5. A device of the character substantially as described, comprising a trough having openings through the side walls thereof, drinking pockets formed at said openings and extending inwardly therefrom, and a closure resting upon and supported by said pockets.

6. A device of the character substantially as described, comprising a trough provided with a series of drinking pockets extending inwardly from the side walls thereof and terminating a distance below the top thereof, and a closure for said trough adapted to lie therewithin and be supported by the upper portions of said drinking pockets.

7. A device of the character substantially as described comprising a trough, drinking pockets extending inwardly from the side walls thereof open at their lower ends and provided with screening thereover, means whereby a determined liquid level is maintained within the tank and said drinking pockets, and means supported by said pockets for closing said trough.

8. A device of the character substantially as described, comprising a trough, drinking pockets extending inwardly from the side walls thereof, said pockets open at their lower ends whereby liquid in said trough may enter, perforated material fastened across the said open lower ends of said drinking pockets, means adapted to maintain a determined liquid level in said trough and said open end pockets, and a closure for said trough supported by said pockets.

9. In a device of the character substantially as described, a trough, drinking pockets formed on said trough, and means supported by said pockets closing said trough.

10. In a device of the character substantially as described, a trough provided with openings in the side walls thereof, means extending inwardly from said walls and across said openings a distance inwardly therefrom, and extending downwardly a distance beyond said openings to form liquid inclosing portions, whereby the contents of the trough below said openings are inclosed by said portions and accessible through the openings in the side walls, and a removable top closure for said trough supported by said means.

11. In a device of the character substantially as described, a trough provided with openings in the side walls thereof, means open at their lower ends extending downwardly beyond each of said openings and inclosing the portions of the contents of the trough lying below said openings and adjacent thereto, whereby said inclosed portions are accessible through said side walls, said means forming cover supports and means for maintaining the contents of the trough and the inclosed portions thereof at a determined level.

12. A device of the character substantially as described, comprising a trough provided with drinking pockets forming brackets adapted to support a cover.

13. An open top trough provided with inwardly extending drinking pockets forming closure supporting means.

14. A drinking trough comprising an open-top water tank, and a removable cover therefor, whereby the water within the tank can be exposed for drinking through said open top on removal of the cover, said tank provided with open bottom drinking pockets arranged within the tank below said open top and dipping below the water level in the tank and having lateral drinking openings in intermediate portions of the surrounding vertical wall of the tank and located above the water level in the tank.

15. A stock drinking trough comprising an open-top water tank adapted to be closed by a removable cover, whereby the water can be exposed for drinking through said open top, said tank provided with vertically arranged drinking pockets around the inner side of the vertical wall of the tank and depending below the water line in the tank and having open lower ends spanned by guard screens each arranged a short distance below the water level, said drinking pockets having lateral drinking openings just above the water level in the tank and arranged in intermediate portions of the surrounding vertical wall of the tank, substantially as described.

CHAS. F. SCOTT.